US005548571A

United States Patent [19]
Mistretta

[11] Patent Number: 5,548,571
[45] Date of Patent: Aug. 20, 1996

[54] METHOD AND APPARATUS FOR IDENTIFYING DATA STORAGE DISKS

[75] Inventor: James C. Mistretta, Rochester, N.Y.

[73] Assignee: Eastman Kodak Company, Rochester, N.Y.

[21] Appl. No.: 317,003

[22] Filed: Oct. 3, 1994

[51] Int. Cl.⁶ .................................................. G11B 23/03
[52] U.S. Cl. ........................ 369/77.2; 369/291; 360/133
[58] Field of Search ................................. 369/48, 58, 32, 369/291, 292, 77.2; 360/133

[56] References Cited

U.S. PATENT DOCUMENTS

| | | | |
|---|---|---|---|
| 4,773,058 | 9/1988 | Petruchik et al. | 369/77.2 |
| 4,817,071 | 3/1989 | Carlson et al. | 369/36 |
| 4,819,114 | 4/1989 | Bernitt et al. | 360/133 |
| 4,945,530 | 7/1990 | Sandell et al. | 369/291 |
| 4,995,029 | 2/1991 | Kobayashi et al. | 360/133 |
| 5,091,815 | 2/1992 | Suzuki | 360/133 |
| 5,091,901 | 2/1992 | Yamamoto et al. | 369/291 |
| 5,173,816 | 12/1992 | Ogihara | 360/133 |
| 5,272,693 | 12/1993 | Fujisawa | 369/291 |
| 5,325,243 | 6/1994 | Rath et al. | 360/133 |

FOREIGN PATENT DOCUMENTS 4-69860  3/1992  Japan .......................... 369/291

*Primary Examiner*—Nabil Z. Hindi
*Attorney, Agent, or Firm*—Raymond L. Owens

[57] ABSTRACT

A protective frame for a data storage disk (e.g., an optical, magneto-optical or magnetic disk) is provided with manufacturer and user information for controlling the operation of a disk drive. The manufacturer information is generally non-alterable by the disk user and may, for example, identify the orientation of the disk in the frame (e.g., side "A" is facing upwards) and the disk's storage capacity (e.g., the recordable number of megabytes or gigabytes). The user information, on the other hand, is alterable by the user and may, for example, indicate the "writeability" of a particular side of the disk, i.e., whether or not such side is write-protected. According to a preferred embodiment, the manufacturer and user information are collectively defined by a predetermined pattern of holes formed in the disk frame. The hole pattern is aligned with a path taken by the frame (and its associated disk) in entering the disk drive housing for utilization. Preferably, this hole pattern is scanned as the disk frame enters the disk drive, and the information it represents is acted upon even before the disk is positioned for rotation. Preferably, the disk drive includes a drive mechanism for engaging and advancing a disk frame into the disk drive at a predetermined speed. A light source located at a fixed location along the path of the disk frame operates to scan illuminate the hole pattern as the frame enters the disk drive, and a photodetector senses the hole pattern as the frame advances past the light source. A suitably programmed microcontroller responds to the photodetector output to cause the disk drive to operate in accordance with the manufacturer and user information represented by the hole pattern in the frame.

17 Claims, 6 Drawing Sheets

METHOD AND APPARATUS FOR IDENTIFYING DATA STORAGE DISKS

BACKGROUND OF THE INVENTION

1. Field of the Invention

The present invention relates to the field of data recording and playback. More particularly, it relates to improvements in methods and apparatus for quickly identifying various key characteristics of a data storage disk presented to a disk utilization device, typically a disk drive, so that such device may operate on the disk accordingly.

2. Discussion of Prior Art

It is known in the art to house a data storage disk, e.g., an optical or magneto-optical disk, in a protective package so that the relatively delicate recording surfaces of the disk cannot be touched or otherwise physically damaged during periods of non-use. For example, in the commonly assigned U.S. Pat. No. 4,819,114 there is disclosed a data storage disk assembly in which a two-sided data storage disk is releasably supported at its periphery within a circular aperture defined by a rectangular frame, referred to as a disk "carrier." During periods in which the disk is not used, the carrier and its associated disk are contained in a box-like "caddy" which totally surrounds the carrier and prevents any inadvertent contact with the disk. When it is desired to use the disk, the caddy is inserted into a disk-utilization device, such as the disk drive or disk library disclosed in commonly assigned U.S. Pat. Nos. 4,773,058 and 4,817,071, respectively. In loading a disk into a disk library of the type disclosed in the '071 patent, the caddy is presented to the entrance of a carrier-unloading station, whereupon the caddy is grasped and advanced to a point at which a pair of fingers enter the caddy through a pair of spring-loaded doors located at the caddy's forward end and grasp the carrier within. Thereafter, the caddy is advanced in the reverse direction, the result being that the carrier (and its disk) is withdrawn from the caddy. The carrier is the advanced along a predetermined path leading either directly to a disk drive unit, or to an empty slot in a rack which is adapted to house a multitude of similar carriers and their associated disks.

The above-mentioned data storage disk assembly is illustrated in FIGS. 1 and 2 of the attached drawings. In FIG. 1, the disk assembly 4 is shown in combination with a disk utilization device 2 having an opening 2a for receiving the disk assembly. The disk assembly basically comprises a data storage disk 6, a disk carrier 8 and a caddy 10. As indicated above and shown in FIG. 2, the carrier comprises a planar frame 12 which defines a generally circular aperture 13 slightly larger than the disk. A pair of spring-loaded latches 14 cooperate with a disk-edge support 16, formed in the aperture-defining wall of the carrier, to releasably support the disk at its peripheral edge within the carrier's aperture. The disk carrier is also provided with certain cut-outs C and notches N in its leading and trailing edges, as determined by the direction in which the carrier is inserted into the disk drive. These cut-outs and notches cooperate with certain carrier-grasping and locating structure within the disk drive to extract the carrier from the caddy and to precisely locate the carrier within the drive.

Important to note in the disk carrier shown in FIG. 2 is that the carrier frame is provided with a pair of spaced holes, H and H', in the vicinity of the forward (or trailing) edge of the disk carrier. These holes serve as the indicia by which the disk drive, through suitable photoelectric sensors within the disk drive, determines whether or not the recording surfaces of the disk are write-protected. The disk user may selectively cover either or both of these holes by moving either or both of a pair of slidably-mounted tabs 18 (which are slidably mounted on the carrier frame) from a position in which a hole is exposed and, hence, detectable, to a position in which such hole is covered and, hence, not detectable. In FIG. 2, both of these holes are shown as being covered by tabs 18, indicating that both recording surfaces are write-protected. As disclosed in the aforementioned '114 patent, the disk user may change the coveting/non-coveting position of the write-protect tabs while the carrier is located within the caddy by sliding either of a pair of write-protected status indicators 20, 20' (shown in FIG. 1) which are slidably mounted on the end wall 10a of the caddy. These status indicators engage the write-protect tabs 18 when the carrier is safely positioned in the caddy, and sliding movement of the status indicators effects a corresponding movement of the write-protect tabs.

In a commercial version of this disk carrier described above, a third hole H" is located in the vicinity of the carrier edge opposite the write-protection holes. This third hole, which is provided by the disk manufacturer and is not alterable or coverable by the disk user, is sensed photoelectrically by the disk drive to determine the orientation of the disk and carrier in the drive, i.e., side A or side B of the disk facing upwards. It should be noted that, in the type of disk assembly discussed herein, the carrier and an associated disk are forever married and, though the disk may be temporarily separated from the carrier for use, it is always returned to the same carrier and in the same orientation.

As may be appreciated from the symmetry of the disk carrier shown in FIG. 2, the carrier may be received by the disk drive in any one of four different orientations, viz., side A facing upwards with carrier end 8A entering the drive first; side A facing upwards with end 8B entering the drive first; side B facing upwards with end 8A entering first; and side B facing upwards with end 8B entering first. In a disk library of the type disclosed in the afore-mentioned U.S. Pat. No. 4,787,074, it is necessary for a carrier to have this four-orientation symmetry since the library is adapted to (a) flip a carrier end-for-end, i.e. about axis X shown in FIG. 2, in order to present either of its two recording surfaces to the disk drive, and (b) insert a carrier into a disk drive with either of the two ends 8A or 8B leading. In order to detect which of the four orientations is present and whether or not the recording side presented is write-protected, the prior art disk drive includes a plurality optical sensors. These sensors are located at various positions within the disk drive to sense the aforementioned holes H, H', H", in the carrier after the carrier has been fully inserted and seated in the disk drive housing.

In the above system for identifying various features or characteristics of a data storage disk, it will be appreciated that the number of sensors in the disk drive is determined by the number of disk features (and the corresponding number of holes or indicia) to be sensed. The number of sensors may be as few as two, or may be as many as eight or more, as would be the case if it were desirable to detect additional features of the disk, such as disk type, storage capacity, etc. In addition to requiring a relatively large number of sensors, the prior art disk drives are disadvantageous in that the feature-identifying indicia on the carrier cannot be read until the carrier has been fully inserted and captured by the drive. This requirement slows down the start-up process.

SUMMARY OF THE INVENTION

In view of the foregoing discussion, an object of the present invention is to minimize the number of sensors required to determine the write-protect status, orientation, storage capacity and similar information provided on the protective housing of a data storage disk.

Another object of this invention is to provide a system for decoding information representing various characteristics of a data storage disk while the disk is transported from the entrance window of a disk utilization device to a position atop a turntable or the like.

Another object of this invention is to provide a readily expandable disk-identification system by which widely varying amounts of disk-feature information can be obtained without significantly changing the system hardware.

According to a preferred embodiment of the invention, manufacturer and user information are collectively defined by predetermined patterns of holes or the like formed in a carrier which supports a data storage disk. The hole patterns are aligned with a path taken by the carrier (and its associated disk) in entering the disk utilization device. The disk utilization device comprises means for scanning the hole patterns as the disk carrier enters the device, thereby enabling the information represented by the hole patterns to be acted upon by the disk drive even before the disk is positioned for rotation. Preferably, the disk drive includes a drive mechanism for engaging and advancing a disk carrier into the disk drive at a predetermined rate. The scanning means preferably comprises a light source located at a fixed location along the path of the disk carrier. The light source functions to illuminate the hole patterns as the carrier enters the disk drive, and a photodetector senses the hole patterns as the carrier advances past the light source. A suitably programmed microcontroller responds to the photodetector output to produce a disk signature code and to cause the disk drive to operate in accordance with the manufacturer and user information represented by this code.

Another aspect of this invention resides in the provision of a new method for identifying the orientation, data capacity and writeability of a data storage disk supported in a protective carrier by detecting (a) pre-recorded manufacturer information and (b) post-recorded user information disposed on such carrier. The new method is characterized by the steps of (i) arranging the manufacturer and user information along a predetermined path on the protective carrier; (ii) providing information-reading means adapted to read the manufacturer and user information; and (iii) reading the manufacturer and user information by producing relative movement between the reading means and the protective carrier in a direction parallel to such predetermined path.

Another aspect of this invention resides in the provision of a data storage disk assembly comprising a data storage disk adapted to have data recorded on opposing surfaces, and a protective housing for constraining lateral movement of the disk. The housing is provided with (i) encoded and non-alterable manufacturer information regarding, for example, the orientation and storage capacity of the disk in the housing, and (ii) encoded, but alterable, user information regarding, for example, the "writeability" of the disk's recording surfaces. This information is adapted to be read from either side of the housing while the housing is advanced along a predetermined path within a disk utilization device. Preferably, the manufacturer information represents at least the orientation of the disk within said housing, and the user information represents at least the writeability of the disk within said housing. Preferably, the encoded information is in the form of a series of spaced holes formed in the housing, and the holes are arranged so as to be read by no more than two hole sensors.

The invention and its various advantages will be better understood from the ensuing detailed description of preferred embodiments, reference being made to the accompanying drawings wherein like reference characters denote like parts.

DETAILED DESCRIPTION OF PREFERRED EMBODIMENTS

Figure 1:
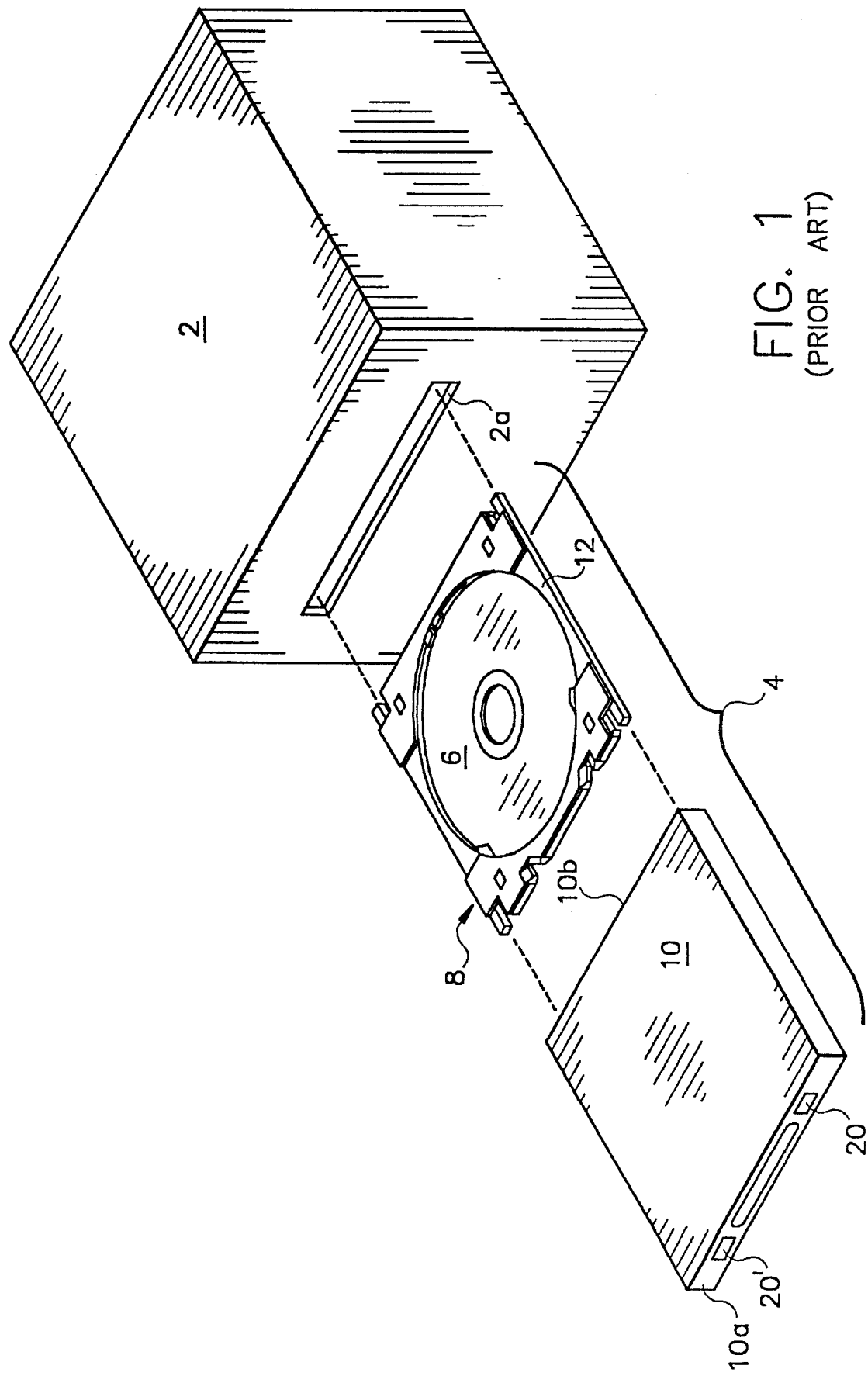
FIGS. 1 and 2 illustrate a data storage disk assembly of the prior art.
Figure 2:
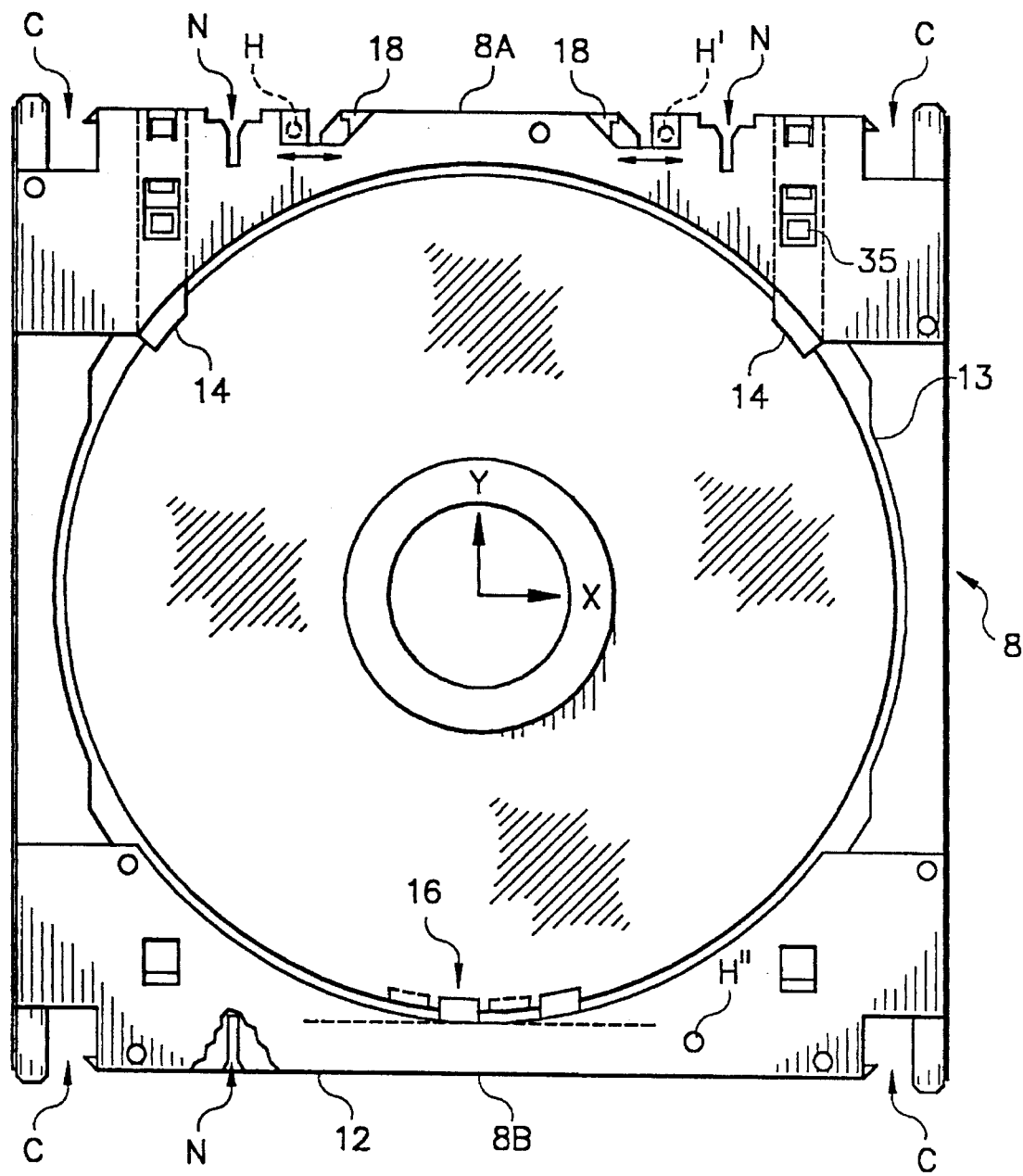
Figure 3:
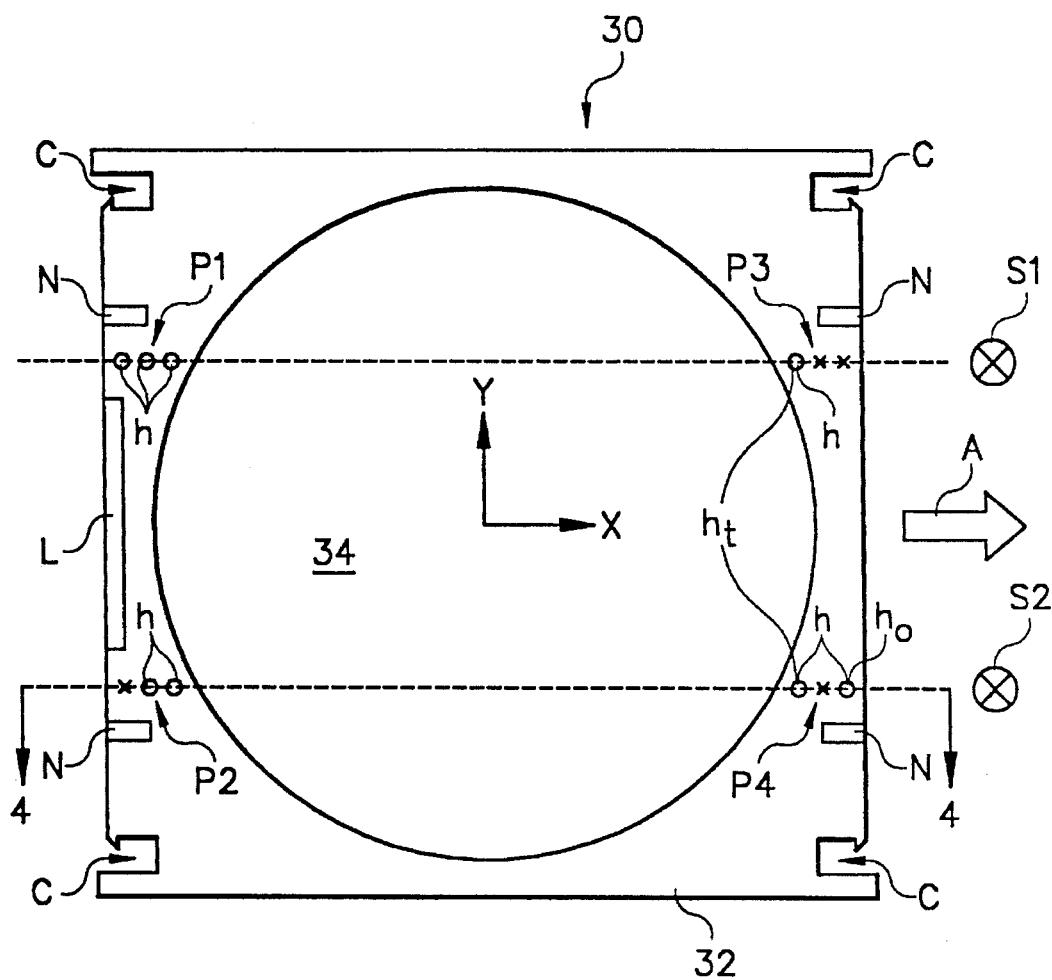
FIG. 3 is a top plan view of a disk carrier bearing feature-identifying structure in accordance with a preferred embodiment of the invention.

Referring now to the drawings, FIG. 3 illustrates a data disk carrier structured in accordance with a preferred embodiment of the invention. Carrier 30 comprises a generally rectangular plastic or metal frame 32 which defines a generally circular aperture 34 for receiving and releasably securing a rigid data storage disk (not shown). A label L containing user-readable information about the disk is provided along one edge of the carrier frame. While the disk itself may be any type, e.g., optical, magnetic or magnetooptic, the carrier of the invention is most useful with two-sided disks having opposing recording surfaces, hereafter referred to as side A and side B. Also, the carrier of the invention is most useful with a disk drive of the type having two write/read heads, whereby both sides of the disk may be written upon or read from without removing the disk from the disk drive. Structurally, carrier 30 is similar in many respects to the prior art carrier described above and disclosed in U.S. Pat. No. 4,819,114, and the disclosure of the '114 patent is incorporated herein by reference. For the sake of clarity, the carrier's disk-retaining details and the slidably-mounted tabs by which the disk user may write-protect the disk's recording surfaces by selectively covering certain indicia on the carrier have been omitted from FIG. 3; the reader is referred to the details of FIG. 2 above and the detailed disclosure of the aforementioned '114 patent.

Now in accordance with one aspect of the present invention, carrier frame 32 is provided with a series of holes h which collectively define four different binary hole patterns P1–P4. These holes extend completely through the carrier frame. In the embodiment shown, each hole pattern may comprise from one to three holes, and the presence, absence and location of the holes in each pattern provide an indication of a disk parameter. As shown, the holes of each pattern are linearly arranged in the direction in which the carrier advances into and out of the disk drive. Each of the hole patterns defines, in binary form, digits from zero to seven. Note, an "X" in the hole pattern denotes the absence of a hole in a region where a hole could be formed. Hole patterns P1 and P2 serve as the indicia for determining the "writeability" of the two recording surfaces of a disk positioned in aperture 34. When all three holes of the hole pattern P1 are visible, side A of the disk may be written upon. Similarly, when both of the holes of hole pattern P2 are visible, information may be written upon side B. As in the case of the prior art carrier discussed above, the disk user may selectively cover each of the hole patterns P1 and P2 by moving a slidably-mounted tab on the carrier, e.g. tab 18 in the FIG. 2 carrier, from a hole pattern-exposing position to a pattern-covering position. When the hole patterns P1 and P2 are covered by the user, as described in the aforementioned '114 patent, the recording surfaces associated therewith are write-protected.

Hole patterns P3 and P4 represent disk manufacturer information that is not coverable or alterable by the disk user; i.e., these holes, however they are laid out, are always visible. In the preferred embodiment, hole patterns P3 and P4 provide the indicia for indicating both the disk orientation, and the disk type or storage capacity. For example, the disk type-indicating holes $h_t$ of patterns P3 and P4 may indicate the storage capacity of the disk and/or the type of recording media, and the presence or absence of the disk orientation hole $h_o$ in pattern P4 determines the disk orientation, i.e., which of the two recording surfaces is facing in a nominal direction, e.g., up. Since each of the hole patterns P3 and P4 may or may not have a type-indicating hole $h_t$, their respective presence or absence can represent a total of four different disk types in binary code.

As shown in FIG. 3, hole patterns P1 and P3 are linearly aligned with each other, in the direction in which the carrier enters and exits the disk drive (indicated by the arrow A). Similarly, hole patterns P2 and P4 are so aligned with each other. A pair of optical sensors S1 and S2 mounted at the entrance of the disk drive serve to detect the hole patterns and the disk information they represent as the carrier enters the drive. Sensor S1 serves to detect patterns P1 and P3, and sensor S2 serves to detect patterns P2 and P4. By this arrangement, the disk information represented by the hole patterns can be read and deciphered by a suitably programmed microcontroller before the disk has been fully received by the disk drive. Preferably, each of the hole sensors comprises a light transmitter and an opposing photodetector located on opposite sides of the carrier path. Only the light passing through the holes is detected by the photodetector. Alternatively, a differential reflection system can be used, in which case the transmitter and receiver are located on the same side of the carrier path. In either case, as the carrier enters the disk drive, sensor S1 serves to scan hole patterns P1 and P3, and sensor S2 serves to scan hole patterns P2 and P4. Each time a hole passes the photodetector, a sensor output (logical 1) is produced for a duration related to the rate of movement of the carrier past the sensor. When no hole is sensed from a location where a hole could be sensed, a logical 0 is produced by the sensor. In the discussion below, hole patterns P3 and P4 are said to comprise a "first field" of holes detected by the sensors, and hole patterns P1 and P2 are said to comprise a "second field" of holes detected by the sensors.

Figure 4:
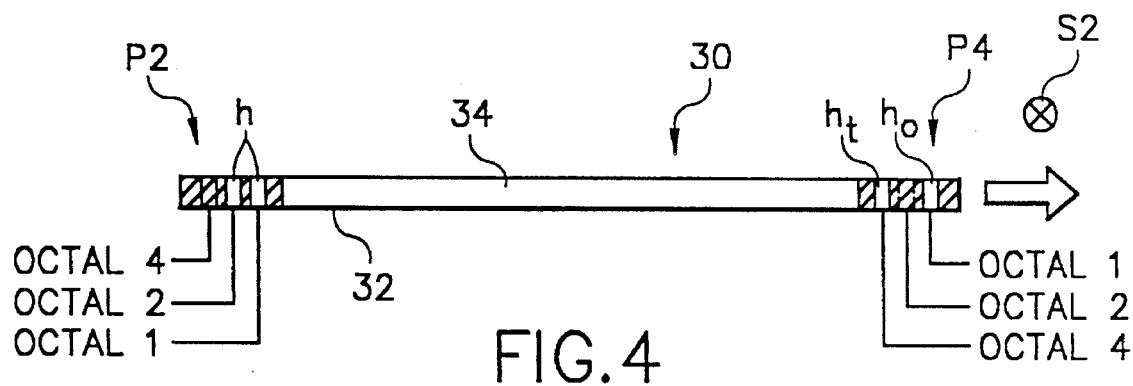
FIG. 4 is a cross-sectional illustration of the FIG. 3 carrier taken along the section line 4—4.

In the cross-sectional illustration of FIG. 4, the manner in which the different hole patterns give rise to a disk signature or code representing the disk's characteristic features information represented by the hole patterns is apparent. As indicated, each potential hole position of a pattern is assigned an octal value, 1, 2 or 4, reading from a direction in which the carrier moves in entering the disk drive. Thus, as the carrier enters the disk drive and moves past sensor S2 in FIG. 4, the first field of holes (i.e., hole pattern P4) produces a numerical value of 5 (i.e., 1 plus 4), and the second field of holes (hole pattern P2) produces a value of 3 (i.e., 1 plus 2); thus, the code represented by the scanned hole patterns shown is "35." An example of how the codes change as a function of carrier orientation and the write-protected status of the two recording surfaces is explained below.

Figure 5A:
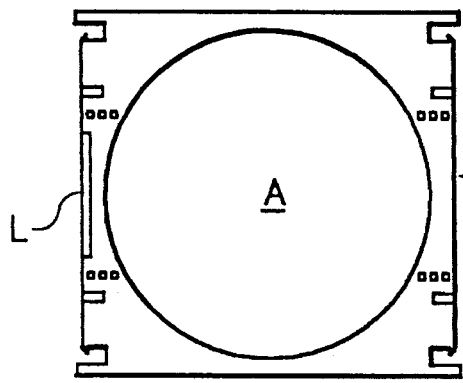
FIGS. 5A–5D show the disk carrier of FIG. 3 in four different orientations.
Figure 5B:
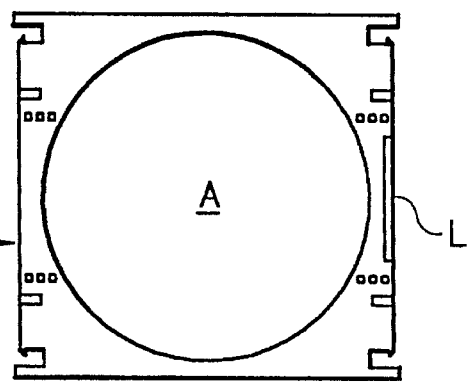
Figure 5C:
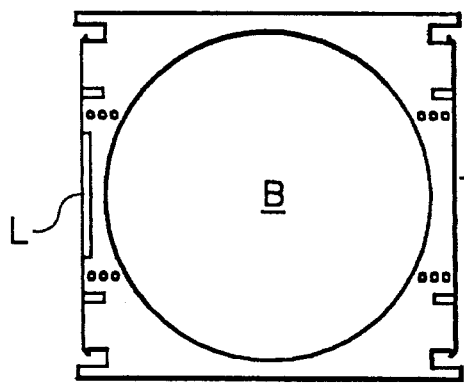
Figure 5D:
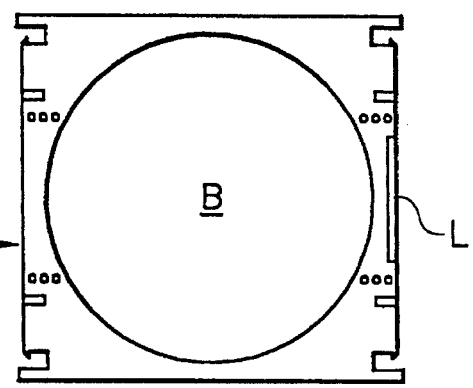

Referring to FIGS. 5A–5D, the disk carrier shown in FIG. 3 is illustrated in each of its four acceptable orientations within the disk drive. In FIGS. 5A and 5B, side A of the disk is up; however, in FIG. 5A, the label L is on the left, whereas in FIG. 5B it is on the right. Similarly, in FIGS. 5C and 5D, side B of the disk is facing up, the orientations differ in that the label side is on the left in FIG. 5C, and on the right in FIG. 5D. Assuming that the carrier enters the drive from left to right, Tables 1 and 2 show the disk signature codes produced by hole sensors S1 and S2 for write-protected and non-write-protected disks, respectively. In each table, the disk type, as represented by holes $h_t$, is the same. It will be appreciated that entirely different signature codes will result if either or both of the holes $h_t$ are absent, thereby indicating that a different disk type is being used. Also, in the tables below, it is assumed that both recording surfaces are either write-protected or not; it will be apparent that different signature codes will result if one side is write-protected and the other is not.

TABLE 1

Neither Recording Surface Is Write Protected
And Disk Orientation Is:

| | Second Field | First Field | Signature Code |
|---|---|---|---|
| As shown in FIG. 3 | | | |
| Sensor 1 | 7 | 4 | 74 |
| Sensor 2 | 3 | 5 | 35 |
| If flipped about X axis | | | |
| Sensor 1 | 3 | 5 | 35 |
| Sensor 2 | 7 | 4 | 74 |
| If flipped about Y axis | | | |
| Sensor 1 | 4 | 7 | 47 |
| Sensor 2 | 5 | 3 | 53 |
| If flipped about X and Y axes | | | |
| Sensor 1 | 5 | 6 | 56 |
| Sensor 2 | 1 | 7 | 17 |

TABLE 2

Both Recording Surfaces Are Write Protected
And Disk Orientation Is:

| | Second Field | First Field | Signature Code |
|---|---|---|---|
| As shown in FIG. 3 | | | |
| Sensor 1 | 0 | 4 | 04 |
| Sensor 2 | 0 | 5 | 05 |
| If flipped about X axis | | | |
| Sensor 1 | 0 | 5 | 05 |
| Sensor 2 | 0 | 4 | 04 |
| If flipped about Y axis | | | |
| Sensor 1 | 1 | 0 | 10 |
| Sensor 2 | 5 | 0 | 50 |
| If flipped about X and Y axes | | | |

TABLE 2-continued

Both Recording Surfaces Are Write Protected
And Disk Orientation Is:

|  | Second Field | First Field | Signature Code |
|---|---|---|---|
| Sensor 1 | 5 | 0 | 50 |
| Sensor 2 | 1 | 0 | 10 |

Figure 6:
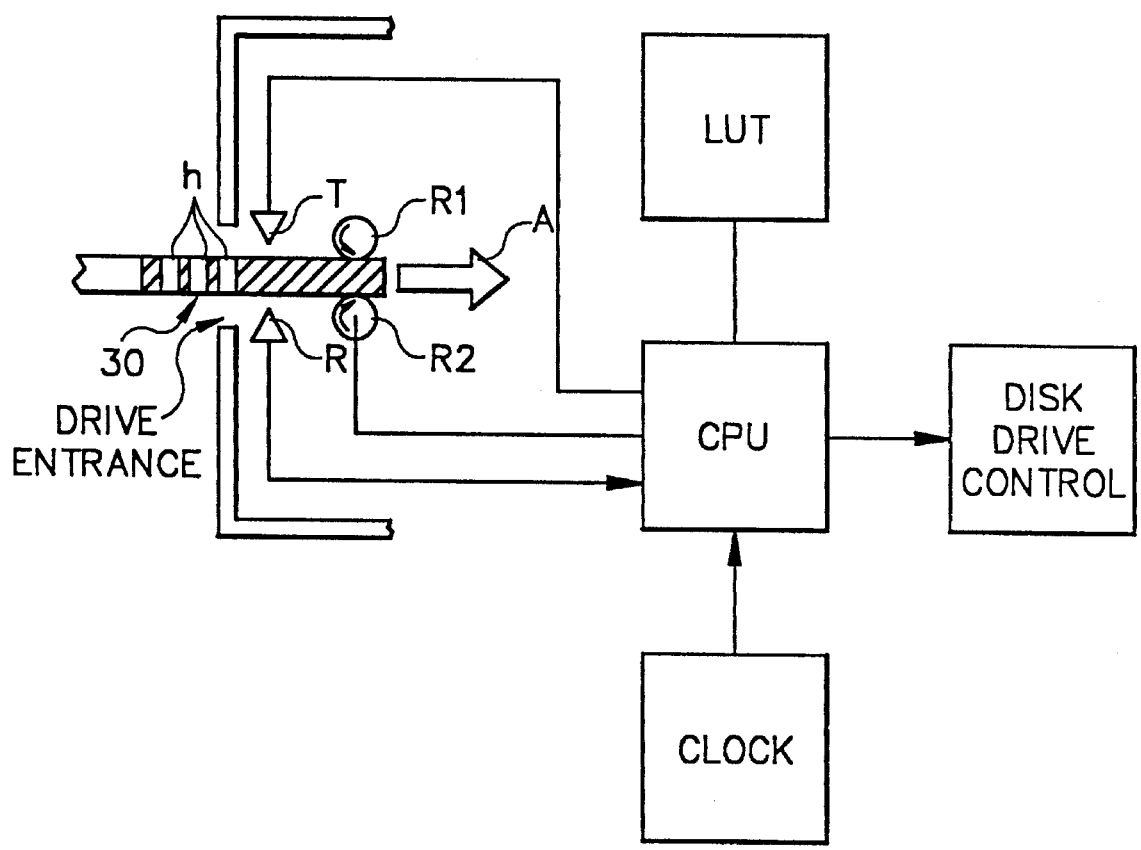
FIG. 6 is a schematic illustration of apparatus adapted to detect the feature-identifying information on the FIG. 3 carrier.
Figure 7:
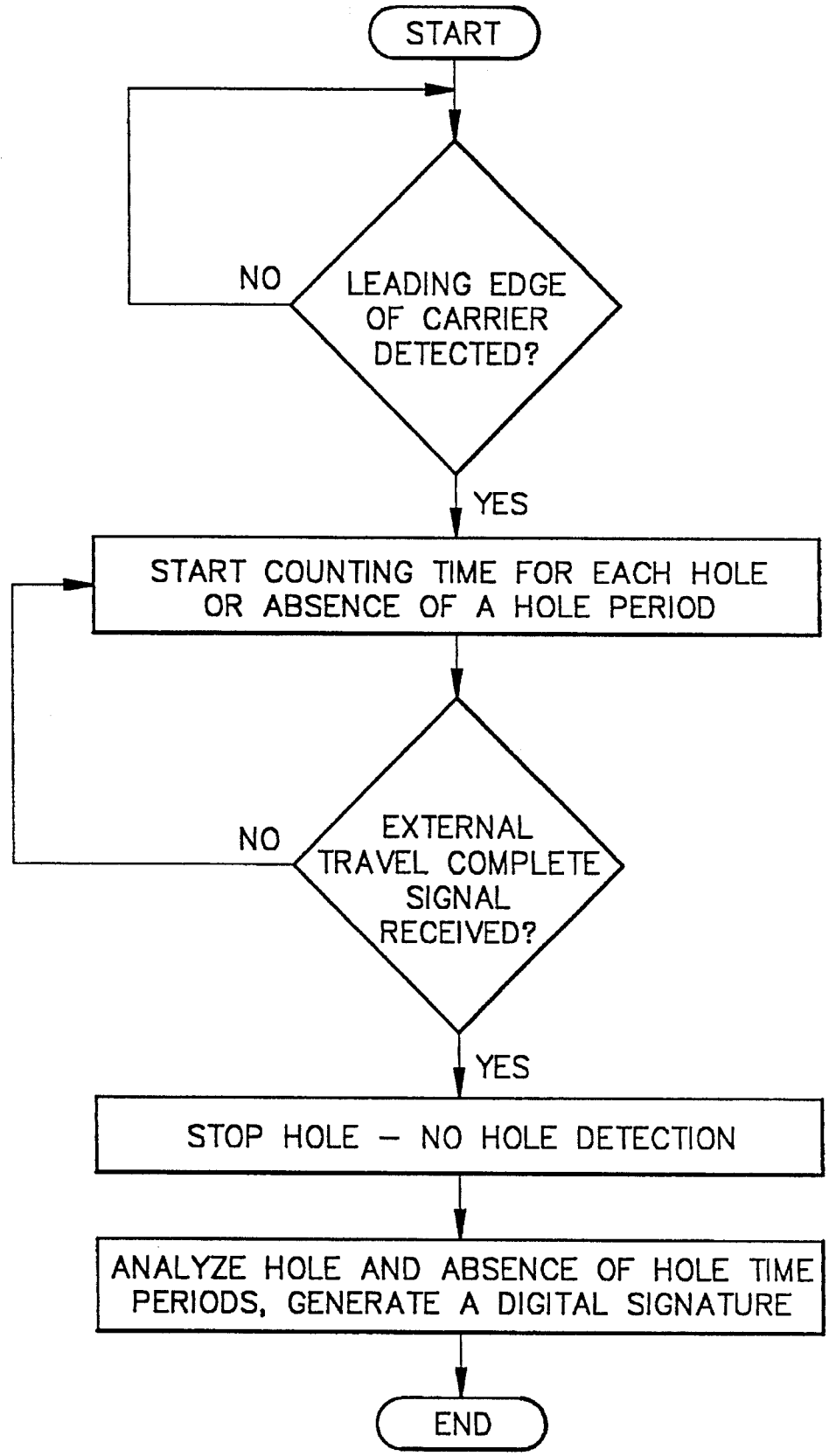
FIG. 7 is a flow chart illustrating the steps carried out by a microcontroller in reading the feature-identifying information on the FIG. 3 carrier.

FIG. 6 schematically illustrates preferred apparatus for advancing carrier 30 within a disk drive past a photoelectric hole sensor. As illustrated, carrier 30 is advanced at a constant rate by a pair of driven pinch rollers R1, R2 which are positioned at the entrance aperture of a disk drive. The drive rollers operate under the control of a conventional microcontroller comprising a central processing unit CPU and a crystal clock C which provides timing for the various functions performed by the CPU. As the carrier enters the disk drive, the sensors detect the leading edge and produce an output to the CPU. The CPU is programmed to respond to this signal by driving rollers R1, R2 until the carrier is advanced (in the direction of the arrow) to a predetermined location within the drive. At the same time, a pair of photosensors, each comprising a light transmitter T and a light-sensitive receiver R, is energized to illuminate those portions of the carrier bearing the hole patterns P1–P4. Light passing through the holes is detected by the receiver elements of the photosensors and the receiver output is applied to the CPU. Based on the timing provided by the clock and the inputs from the light-sensitive receivers, the CPU determines the carrier's signature code. Through a programmed look-up table LUT or the like which stores the disk drive parameters as a function of carrier code, the CPU determines the manner in which the disk drive should act upon the received disk. A flow chart indicating the steps carried out by the CPU in determining the carrier's signature code is shown in FIG. 7.

While the invention above has been described with particular reference to a preferred embodiment, it will be apparent to skilled artisans that various modifications can be made without departing from the spirit of the invention. For example, rather than using holes in the carrier frame as indicia of the disk features, other markings, such as a bar code or the like, could be used as well. It is important, however, that the alternative markings be detectable no matter what the disk orientation. Moreover, it should be apparent that the number of holes (or marks) in each of the patterns P1–P4 can be easily increased to provide further information about the disk. Regardless of the number of holes, marks, bars etc., no more than two sensors need be provided to detect the information represented by such holes, marks and bars. Only the software, e.g. the look-up table, in the microcontroller need be altered to reflect the increased number of new signatures produced by the increase in data.

PARTS LIST

| 2 | disk utilization device |
|---|---|
| 2a | opening |
| 4 | disk assembly |
| 6 | disk |
| 8 | disk carrier |
| 8A | carrier end |
| 8B | carrier end |
| 10 | caddy |
| 10a | end wall |
| 12 | frame |
| 13 | aperture |
| 14 | latches |
| 16 | support |
| 18 | tabs |
| 20 | indicator |
| 20' | indicator |
| 30 | carrier |
| 32 | frame |
| 34 | aperture |
| H | spaced hole |
| H' | spaced hole |
| H" | spaced hole |
| P1–P4 | binary hole patterns |
| R1 | pinch roller |
| R2 | pinch roller |
| S1 | optical sensor |
| S2 | optical sensor |

What is claimed is:

1. A method for identifying certain properties of a data storage disk supported in a protective housing by detecting (a) disk-manufacturer information and (b) disk-user information disposed on said housing, said method comprising the steps of:

(i) arranging said disk-manufacturing and disk-user information along a predetermined path on said protective housing, wherein said disk-manufacturing information comprises a plurality of hole patterns and said disk-user information comprises a plurality of hole patterns, wherein each of said plurality of hole patterns comprising said disk-manufacturing information and said disk-user information includes a plurality of hole position that define a binary code corresponding to a decimal digit ranging from at least zero to seven;

(ii) providing information-reading means adapted to read said disk-manufacturer and disk-user information;

(iii) reading said disk-manufacture, and disk-user information by producing relative movement between said reading means and said protective housing in a direction parallel to said path.

2. The method as defined by claim 1 wherein said predetermined path is a linear path.

3. The method as defined by claim 1 wherein said manufacturer and user information are optically detectable, and wherein said information-reading step comprises the step of detecting said information photoelectrically.

4. The method as defined by claim 1 wherein said disk-manufacturer and disk-user information is encoded, and wherein said reading step comprises the step of decoding said encoded information.

5. The method as defined by claim 1 wherein said disk-manufacturer information relates to the disk orientation within a disk drive as well as disk-type in capacity, and wherein said disk-user information relates to the writable status of the disk.

6. The method as defined by claim 1 wherein disk-manufacturer information is unalterable by the disk user, and wherein the disk-user information is alterable by the user.

7. A data storage disk assembly comprising:

a data storage disk adapted to have data recorded on opposing surfaces; and a protective housing for restricting movement of said disk, said protective housing bearing (i) disk-manufacturer information and (ii) disk-user information on opposing surfaces thereof;

wherein said disk-manufacturer information represents at least the orientation of the disk within said housing and comprises a plurality of hole patterns;

wherein said disk-user information represents at least the writeability of the disk within said housing and comprises a plurality of hole patterns, wherein each of said plurality of hole patterns comprising said disk-manufacturing information and said disk-user information includes a plurality of hole positions that define a binary code corresponding to a decimal digit ranging from at least zero to seven; and wherein said disk-manufacturer information and said disk-user information are adapted to be read during movement of said assembly into a disk utilization device.

8. The data storage disk assembly as defined by claim 7 wherein said manufacturer and user information is encoded information.

9. The data storage disk assembly as defined by claim 7 wherein said encoded information is adapted to be decoded by reading means positioned at a fixed location on said disk-utilization device as said assembly is advanced into said device for utilization.

10. The data storage disk assembly as defined by claim 7 wherein said encoded information is photoelectrically detectable.

11. The data storage disk as defined by claim 7 wherein disk-manufacturer information is unalterable by the disk user, and wherein the disk-user information is alterable by the user.

12. In a data disk drive adapted to read and write data on either of two opposing surfaces of a data disk, said data disk being releasably supported by a frame having disk-manufacturer information thereon representing at least the orientation of a disk in said frame and disk-user information representing at least the writeability of such disk, said disk drive comprising a housing having an aperture therein for receiving a frame and a supported disk, and apparatus for reading said disk-manufacturer information and said disk-user information and for causing said disk drive to operate in accordance with the information read, said apparatus comprising:

drive means located proximate said aperture for engaging and advancing a frame and a supported disk into said housing along a predetermined path; and information sensing means located proximate said aperture and adjacent said path for sensing said disk-manufacturer information and said disk-user information as said frame advances along said path;

wherein said disk-manufacturer information comprises a plurality of hole patterns and said disk-user information comprises a plurality of hole patterns formed at predetermined spaced locations in said frame along a line that parallels said path, wherein each of said plurality of hole patterns comprising said disk-manufacturing information and said disk-user information includes a plurality of hole positions that define a binary code corresponding to a decimal digit ranging from at least zero to seven; and wherein said sensing means includes a light source and light detector for respectively illuminating said frame means at a fixed location along said line and for detecting source light either transmitted or reflected by said frame.

13. The apparatus as defined by claim 12 wherein said information is encoded and wherein said information sensing means includes means for decoding said encoded information.

14. The apparatus as defined by claim 12 wherein said information is optically detectable, and wherein said sensing means includes means for optically detecting said information.

15. The method as defined in claim 1 wherein said disk-manufacturing information and said disk-user information is arranged on said protective housing in order to permit the information reading means to read the disk-manufacturing information and the disk-user information regardless of orientation of said protective housing with respect to said reading means, as said relative movement is produced between said protective housing and said reading means.

16. The data storage disk assembly as defined in claim 7 wherein said disk-manufacturing information and said disk-user information is arranged on said protective housing in order to permit said disk utilization device to read the disk-manufacturing information and the disk-user information regardless of orientation of said protective housing with respect to said disk utilization device, as said assembly is moved into said disk utilization device.

17. The apparatus as defined in claim 12 wherein said disk-manufacturing information and said disk-user information is arranged on said frame in order to permit said information sensing means to sense said disk-manufacturing information and said disk-user information regardless of orientation of said frame with respect to said information sensing means, as said frame is advanced along said predetermined path by said drive means.

* * * * *